A. R. McFARLANE.
SCALE.
APPLICATION FILED OCT. 19, 1914.

1,177,194. Patented Mar. 28, 1916.

WITNESSES
M. R. McInnis
E. A. Paul

INVENTOR
ARTHUR R. McFARLANE
BY
Paul & Paul
ATTORNEYS

UNITED STATES PATENT OFFICE.

ARTHUR R. McFARLANE, OF MINNEAPOLIS, MINNESOTA.

SCALE.

1,177,194.  Specification of Letters Patent.  Patented Mar. 28, 1916.

Application filed October 19, 1914. Serial No. 867,286.

*To all whom it may concern:*

Be it known that I, ARTHUR R. McFAR-LANE, citizen of the United States, resident of Minneapolis, county of Hennepin, State of Minnesota, have invented certain new and useful Improvements in Scales, of which the following is a specification.

My invention relates to platform scales and particularly to that type of scale where a dial and indicator hand is employed for indicating the load on the scale platform, and the object of the invention is to provide a scale of simple, durable construction, one which will be extremely sensitive in operation as well as accurate and reliable.

Other objects of the invention will appear from the following detailed description.

The invention consists generally in various constructions and combinations, all as hereinafter described and particularly pointed out in the claims.

Figure 1:
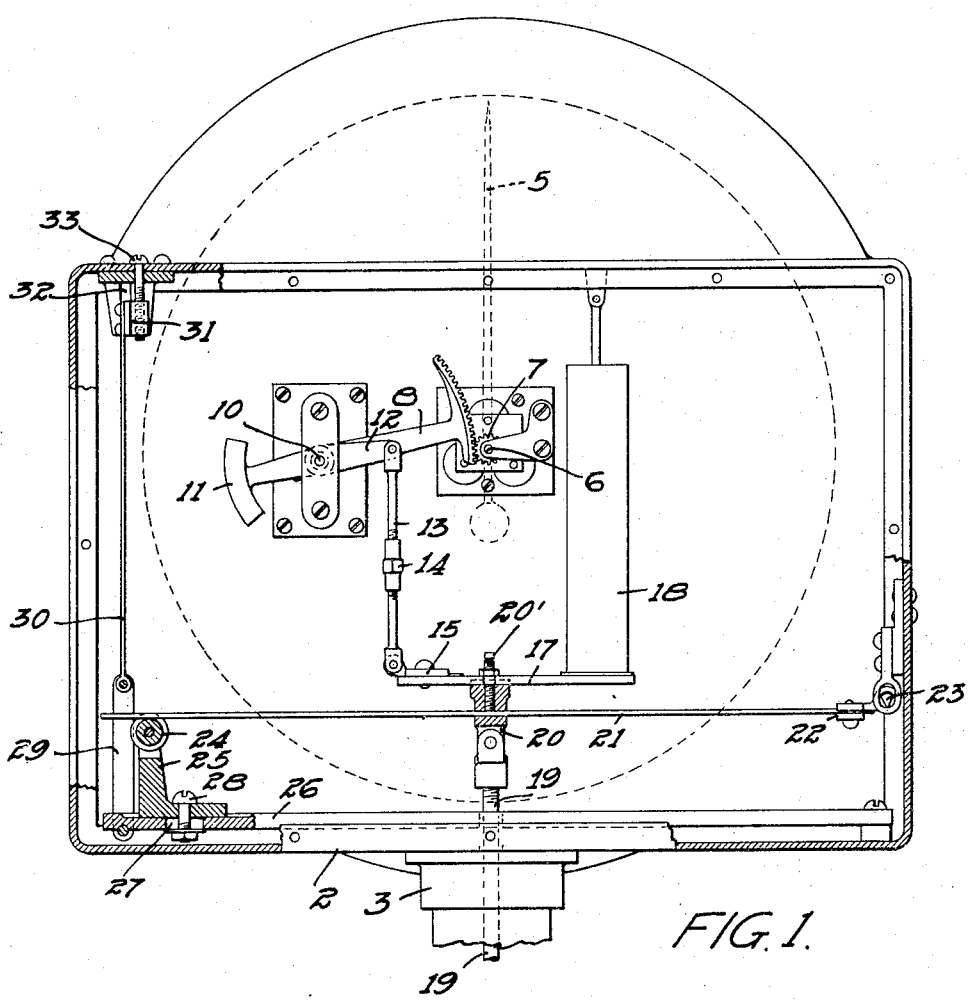
Figure 2:
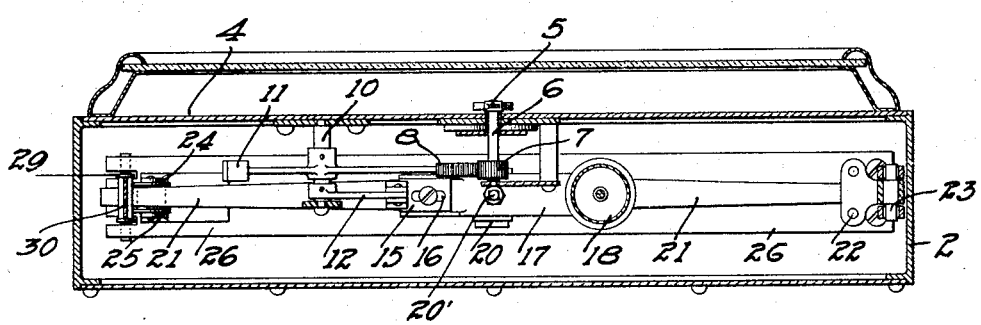

In the accompanying drawings forming part of this specification, Figure 1 is a view, partially in section, of the casing of the scale, showing the operating mechanism, Fig. 2 is a horizontal sectional view of the same.

In the drawing, 2 represents a suitable casing, supported on a standard 3 and provided with a graduated dial 4.

5 is an indicator hand, mounted to move over the graduations of the dial and carried by a post 6 on which a pinion 7 is mounted. A quadrant 8 has a toothed rack at one end to mesh with the pinion 7, and at a point near the middle portion thereof is mounted on a shaft 10. The other end of the quadrant is provided with a weight 11. An arm 12 projects outwardly from the shaft 10 and is pivotally connected with a rod 13, made in sections and having a turn buckle 14 connecting the abutting ends of the sections for adjustment purposes. The lower section of the rod 13 is pivotally connected to a plate 15 that is adjustable by means of a pin and slot connection 16 on one end of a bar 17. The adjustment of the plate 15 back and forth on its supporting bar 17 provides for adjustment of the quadrant to regulate the movement of the indicator hand. The other end of the bar 17 is connected with the plunger of a dash-pot 18, whereby the uniform, regular movement of the bar 17 is insured. A scale rod 19, of ordinary construction, projects up through the bottom of the casing and is provided with a coupling 20, pivotally mounted on the scale rod and clamped on the underside of the bar 17 by suitable means, such as the set screw 20'. The coupling 20 has a transverse slot therein through which a bar 21 of spring material is inserted and clamped, if desired, by means of the set screw 20'. This plate, as shown in Fig. 2, is tapered, preferably from the middle portion toward each end, for the purpose of obtaining a uniform flexing of the plate, causing it to bend from end to end in a uniform curve rather than at one point, which might result if the plate were the same width throughout its length. One end of the plate 21 is mounted in a clamp 22 having a suitable bearing 23, preferably knife-edge, on the wall of the casing. The plate extends horizontally across the casing to a point near the opposite wall thereof and rests upon a roller 24 mounted in a bracket 25 that is adjustable lengthwise of a bar 26, preferably of wood, that is mounted at one end on the bottom of the casing, beneath and parallel with the spring plate 21. The adjustment of the bracket 25 is effected by means of a longitudinal slot in the bar 26, and a bolt 28 which passes through the bracket and slot. A U-shaped stirrup 29 has a bearing for one end of the bar 26 and a ribbon 30 is attached to said stirrup at its lower end and is secured to a block 31 at its upper end that is vertically adjustable in a guide 32 by means of an adjusting screw 33. The bar 26 will not be affected longitudinally by expansion and contraction and consequently the distance between the pivotal point of the bar 21 and its bearing on the roller 24 will always remain the same and expansion and contraction of the spring bar may take place without affecting the accuracy of the scale or requiring adjustment with every marked change in temperature. The spring plate will be flexed by the downward movement of the scale rod, the degree of its resistance depending, of course, upon the length of the plate and the ratio of its flexibility with respect to the pull of the scale rod. The plate can be made of such length and thickness that it will be flexed by a comparatively slight pull on the rod, thus adapting the scale for weighing very light articles, while, whenever desired, the plate can be made heavier and thicker, to be affected only by a considerable load on the scale.

In setting up the scale, the bracket 25 can be moved back and forth to increase or decrease the effective length of the spring plate until the desired adjustment of the indicator hand is obtained. I have found that the use of this flat spring insures uniformity of travel of the indicator hand at different points of the dial and by making provision for variation in the length of the metal spring, resulting from expansion and contraction, I am able to produce a reliable scale and one that will be unusually accurate at all points on the dial.

I claim as my invention:

1. A scale comprising a casing, a spring member supported at one end in said casing, a bearing mounted in said casing whereon the other end of said member is loosely seated with freedom of expansion or contraction, a scale rod connected with said member near the middle portion thereof, a weight indicating device, and mechanism operatively connecting said weight indicating device with said scale rod.

2. A scale comprising a casing, a plate of spring material supported at each end within said casing, a scale rod having means for connection with the middle portion of said plate to flex the same under the weight of the load on the scale, an indicator hand and dial, mechanism operatively connecting said indicator hand with said scale rod, and including means for yieldingly resisting the movement of said hand.

3. The combination, with a scale rod, of a spring member pivotally supported at one end, a bearing for the opposite end of said member, said bearing allowing freedom of expansion and contraction of said member, a scale rod, a coupling connected to said rod and having a bearing on said member, an indicator hand and dial, and means operatively connecting said indicator hand with said coupling.

4. A scale comprising a casing, a spring plate pivotally supported at one end therein, a bar arranged parallel with said plate and composed of material unaffected longitudinally by changes of temperature, means mounted on said bar and having a bearing for the free end of said plate and permitting freedom of expansion and contraction thereof, the distance between the pivotal support of said plate and said bearing being constant, a scale rod, a coupling therefor having a bearing on said plate intermediate to its ends, an indicating device operatively connected with said coupling, said plate resisting the pull of said rod thereon.

5. A scale comprising a casing, a flat spring plate pivotally supported at one end therein, a bar mounted in said casing, parallel with said plate, a stirrup supporting one end of said bar, a bracket mounted on said bar and having a bearing for the free end of said plate, said bar being composed of material unaffected longitudinally by changes of temperature, whereby the distance between the pivotal point of said bearing remains constant, a scale rod having a bearing on said plate, an indicator hand and dial, and suitable connections between said indicator hand and said coupling.

6. A scale comprising a casing, a spring plate supported at one end therein, a bar mounted at one end in said casing parallel, substantially, with said plate and composed of material unaffected longitudinally by changes of temperature, a stirrup wherein the other end of said bar is supported, means for adjusting said stirrup vertically to aline said bar with said plate, a bearing mounted on said bar and whereon the free end of said plate is supported with freedom of longitudinal movement, a scale rod having a bearing on said plate intermediate to its ends and adapted to flex the same when the load is placed on the scale platform, an indicating device and means operatively connecting said indicating device with said scale rod.

7. The combination, with a scale rod, of a flexible plate supported at its ends transversely of said rod, a coupling connected with said scale rod and having a bearing on said plate, a bar connected to said coupling, an indicator hand, a quadrant geared thereto, a rod pivotally connected with said quadrant and having an adjustable connection with said bar, for the purpose specified.

8. The combination, with a scale rod, of a spring plate supported at its ends, a coupling connected with said rod and having a bearing on the middle portion of said plate, an indicator hand, a quadrant geared thereto, a rod pivotally connected with said quadrant and means adjustably connecting said rod with said coupling parallel, substantially, with said plate, said adjustable connection permitting the movement of said rod toward or from said coupling to vary the movement of said quadrant and said indicator hand.

9. A scale comprising a casing, a spring member supported at both ends within said casing, a scale rod having means for connection with the middle portion of said member, an indicating device connected with said rod and member, and a poise device positioned to resist the pull of said rod on said member.

10. A scale comprising a flexible member, a support for one end thereof, a second support for the other end of said member and whereon said member has freedom of expansion and contraction, said second support remaining a fixed distance from the first named support of said member, a scale rod having a bearing on said member, and an indicating device operatively connected with said scale rod.

11. The combination, with a scale rod, of a flexible plate pivotally supported at one end transversely of said rod, a support whereon the other end of said plate is loosely seated, an indicator hand, means connecting said scale rod with the middle portion of said plate and with said indicator hand, said plate being flexed by the downward movement of said rod and resisting such movement to balance the load on the scale.

In witness whereof, I have hereunto set my hand this 14th day of October, 1914.

ARTHUR R. McFARLANE.

Witnesses:
GENEVIEVE E. SORENSEN,
EDWARD A. PAUL.